United States Patent [19]
Fünfschilling et al.

[11] Patent Number: 5,903,330
[45] Date of Patent: May 11, 1999

[54] OPTICAL COMPONENT WITH PLURAL ORIENTATION LAYERS ON THE SAME SUBSTRATE WHEREIN THE SURFACES OF THE ORIENTATION LAYERS HAVE DIFFERENT PATTERNS AND DIRECTION

[75] Inventors: Jürg Fünfschilling; Martin Rüetschi, both of Basel; Martin Schadt, Seltisberg, all of Switzerland; Hubert Seiberle, Weil am Rhein, Germany

[73] Assignee: Rolic AG, Zug, Switzerland

[21] Appl. No.: 08/730,369

[22] Filed: Oct. 15, 1996

[30] Foreign Application Priority Data

Oct. 31, 1995 [CH] Switzerland ............... 3075/95

[51] Int. Cl.$^6$ .............. G02F 1/1333; G02F 1/1337
[52] U.S. Cl. ............... 349/129; 349/88; 349/127; 349/128; 349/132
[58] Field of Search ............. 349/88, 127, 128, 349/129, 132

[56] References Cited

U.S. PATENT DOCUMENTS

| | | | |
|---|---|---|---|
| 4,824,747 | 4/1989 | Andrews | 430/1 |
| 4,845,014 | 7/1989 | Landany | 430/323 |
| 4,974,941 | 12/1990 | Gibbons et al. | 349/24 |
| 5,106,432 | 4/1992 | Matsumoto et al. | 148/33.2 |
| 5,262,882 | 11/1993 | Hikmet | 349/127 |
| 5,280,375 | 1/1994 | Tsuda et al. | 349/128 |
| 5,568,294 | 10/1996 | Lee | 349/117 |
| 5,602,661 | 2/1997 | Schadt et al. | 349/124 |

FOREIGN PATENT DOCUMENTS

| | | |
|---|---|---|
| 545 234 | 11/1992 | European Pat. Off. |
| 611 981 | 2/1994 | European Pat. Off. |
| 689 065 | 6/1995 | European Pat. Off. |
| 689 084 | 6/1995 | European Pat. Off. |

OTHER PUBLICATIONS

Abstract No. JP4016927.
Abstract for Document B1—545 234.
Abstract for Document B2—611 981.
U.S. application No. 08/489,865, Schadt et al., filed Jun. 13, 1995.
U.S. application No. 08/489,866, Schadt et al., filed Jun. 13, 1995.

*Primary Examiner*—William L. Sikes
*Assistant Examiner*—Julie Ngo
*Attorney, Agent, or Firm*—Bryan Cave LLP

[57] ABSTRACT

An optical component includes a substrate or cell having two spaced-apart substrates, one or more orientation layers on the substrates and one or more anisotropic layers of cross-linked liquid crystalline monomers or oligomers with locally different orientation of the liquid crystal molecules. The surfaces of the orientation layers adjacent the liquid crystalline layers have orientation patterns with a defined parallel or fan-like line structure in locally limited regions. The average spacing between the lines of the fan-like line structure is not greater than the thickness of the liquid crystal layer and the angle between neighboring lines is not greater than 3°.

14 Claims, 2 Drawing Sheets

OPTICAL COMPONENT WITH PLURAL ORIENTATION LAYERS ON THE SAME SUBSTRATE WHEREIN THE SURFACES OF THE ORIENTATION LAYERS HAVE DIFFERENT PATTERNS AND DIRECTION

BACKGROUND OF THE INVENTION

1. Field

The invention relates to an optical component comprising one or two substrates, one or more orientation layers on each substrate, and one or more anisotropic films of cross-linked liquid crystalline monomers or oligomers with locally different orientation of the liquid crystal molecules on the substrate or between the substrates. The invention also relates to the production and use of such components.

2. Description

Anisotropic transparent or colored polymer network layers with highly-resolved pre-set three-dimensional orientation of the optical axis are of great importance in display technology, integrated optics and prevention of forgery.

EP-A-545 234 discloses liquid crystal cells with fine structures comprising regions with defined different orientation and consequently different refractive indices. Refractive index patterns of this kind in a liquid crystal are produced by micromechanically generating a line structure on the surface of the orientation layer bounding the liquid crystal using a stylus moving in correspondence with the scanning pen of a scanning force microscope (scanning probe or atomic force microscope ["AFM"]). Depending on the pressure exerted by the stylus, the lines can consist of relatively pronounced grooves or mere of strings of uniformly aligned molecules. In the following description, the term "scratching" is used for the process of producing a line structure by means of a stylus. In a cell of plates structured in this manner, the pattern on the orientation layer constitutes an orientation pattern which is transferred to the liquid crystal. Optically non-linear liquid crystalline or optionally frozen-in optical waveguide structures are important applications.

European Patent Publication No. 611 981, corresponding to U.S. application Ser. No. 08/194,234, which is commonly owned with the present application, the contents of which are herein incorporated by reference discloses materials and methods of stabilizing orientation structures in monomeric liquid crystals by cross-linking. The orientation structures in the liquid crystal are induced by orientation layers of a photo-orientatable polymer network ("PPN layers"). To this end, in a first step the desired pattern is generated photochemically with polarized light in the PPN orientation layer and in a second step is transferred to a liquid crystal layer deposited thereon by spin coating (the "PPN method"). The liquid crystal structure is then stabilized by cross-linking. A cross-linked liquid crystal layer of this kind will hereinafter be called LCP ("liquid crystal polymer") for short.

European Patent Publication No. 689 084, corresponding to U.S. application Ser. No. 08/489,865, which is commonly owned with the present application, the contents of which are herein incorporated by reference, describes optical components having a layer structure of a number of PPN orientation layers and anisotropic layers of cross-linked liquid crystalline monomers. All of these are subject to the limitations of the PPN method, for example, limited resolution, only slightly variable direction of director and limited control of tilt angle.

The not yet published Swiss Patent Application No. 2036/95, corresponding to U.S. application Ser. No. 08/667, 687, which is commonly owned with the present application, the contents of which are herein incorporated by reference, describes the production and use of optical components for use as masks, such as for transferring a polarization pattern to a polarization-sensitive layer.

European Patent Publication No. 689 065, which is commonly owned with the present application, corresponding to U.S. application Ser. No. 08/489,866, the contents of which are herein incorporated by reference, describes optical PPN components with a layer structure and the production thereof. Such components are particularly suitable for use against forgery.

It has now been found that the use of cross-linkable liquid crystals together with micromechanically scratched orientation layers can result in structures having much better or even completely new properties.

SUMMARY OF THE INVENTION

The present invention provides an optical component comprising a substrate, one or more orientation layers, and one or more anisotropic liquid crystal layers of cross-linked liquid crystalline monomers or oligomers having locally different orientation of the liquid crystal molecules. Each of the one or more orientation layers has a surface that is adjacent to a liquid crystal layer. The surface of the orientation layer adjacent the liquid crystal layer has an orientation pattern with a defined parallel or fan-like line structure in locally limited regions. The average spacing between the lines of the parallel or fan-like line structure is not greater than the thickness of a liquid crystal layer and the angle between neighboring lines is not greater than 3°. As used herein, the term "fan-like" describes a plurality of lines in which neighboring lines have a common point of intersection.

The subject invention also provides an optical component comprising a cell consisting of two spaced-apart substrates, one or more orientation layers on each substrate, and one or more anisotropic liquid crystal layers of cross-linked liquid crystalline monomers or oligomers disposed between the orientation layers and having locally different orientation of the liquid crystal molecules. Each of the one or more orientation layers has a surface that is adjacent to a liquid crystal layer. The surface of the orientation layer adjacent the liquid crystal layer has an orientation pattern with a defined parallel or fan-like line structure arranged in locally limited regions within the orientation pattern. The average spacing between the lines of the parallel or fan-like line structure is not greater than the thickness of a liquid crystal layer and the angle between neighboring lines is not greater than 3°.

In addition, with regard to the optical components described above, at least one of the one or more liquid crystal layers may comprise a mixture of monomers or oligomers which before cross-linking were liquid crystalline during at least the period of processing and over a temperature interval of at least 1° C. in the range from 0° to 60°.

The subject optical components can be produced by a process comprising (a) providing a substrate, (b) coupling an orientation layer with the substrate, (c) micromechanically producing a parallel or fanlike line structure on the surface of the orientation layer, (d) applying a liquid crystal layer of liquid crystalline oligomers or monomers to the orientation layer, and (e) cross-linking the liquid crystal layer.

BRIEF DESCRIPTION OF THE FIGURES

Embodiments of the invention will now be described with reference to the accompanying drawings in which.

DETAILED DESCRIPTION OF THE INVENTION

The subject invention will now be described in terms of its preferred embodiments. These embodiments are set forth to aid in understanding the subject invention, but are not to be construed as limiting.

According to the invention, the component referred to hereinbefore is characterized in that the surfaces of the orientation layers adjacent the liquid crystal layers have orientation patterns with a defined parallel or fan-like line structure arranged in locally limited regions within the orientation patterns, the average spacing between the lines of the parallel or fan-like line structure not being greater than the thickness of the liquid crystal layer and the angle between neighboring lines being not greater than 3°.

Smaller structures, for example, can be produced in this way, in contrast to the PPN process. In addition to the preferred direction, the tilt angle of the molecules can be controlled and altered, and the preferred direction can vary continuously locally. The present component needs only one substrate, in contrast to the liquid crystal cells described in EP-A-545 234. Three-dimensional structures (multiple layers) can also be constructed.

Figure 1:
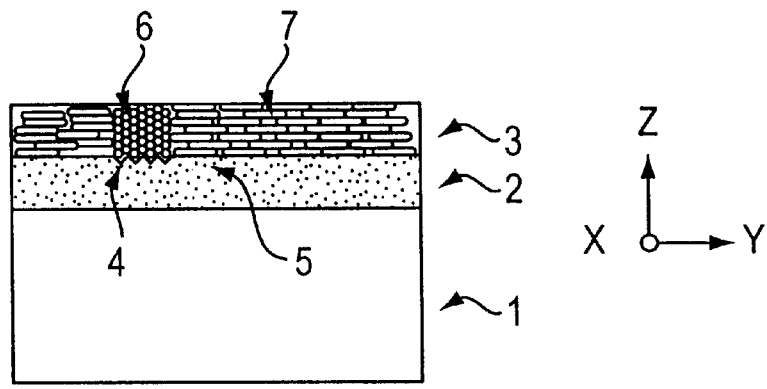
FIG. 1 is a diagrammatic sectional representation of an embodiment of a component according to the invention.

As shown in FIG. 1, an orientation layer 2 is disposed on a substrate 1 (for example, glass). The layer preferably consists of polyimide and is applied preferably by spin coating in a manner known to a person skilled in the art. In a first step, the orientation layer is rubbed in a conventional manner parallel to the y-direction shown in the drawing. The purpose, as is known, is to obtain substantially uniform orientation of an adjacent liquid crystal layer parallel to the direction of rubbing. Next, a desired orientation pattern is scratched by a micromechanical stylus. The method of controlling a stylus is known from the technique of scanning probe microscopy. She stylus moves parallel to the x-axis and produces a fine structure on the surface, diagrammatically indicated by grooves 4 in the drawing. Next, a suitable liquid crystal monomer mixture of desired thickness is applied by spin-coating. In the non-scratched regions 5 the liquid crystal layer becomes oriented parallel to the original direction of go rubbing y and in the scratched region 4 parallel to the direction x of scratching. The orientation pattern can be written in with a single stylus or by a number of styluses in parallel.

Next, the liquid crystal layer is stabilized by chemical or photochemical cross-linking. If individual parts of the layer do not need to be fixed, in the case of photochemical cross-linking, illumination can be through a suitable mask in the last-mentioned step. In this example, therefore, the finished LCP layer comprises regions 7 in which the liquid crystal molecules are oriented parallel to the direction y of rubbing, and regions 6 in which the molecules are oriented parallel to the direction x of rubbing.

Figures 5A, 5B, 5C, 5D, 5E:
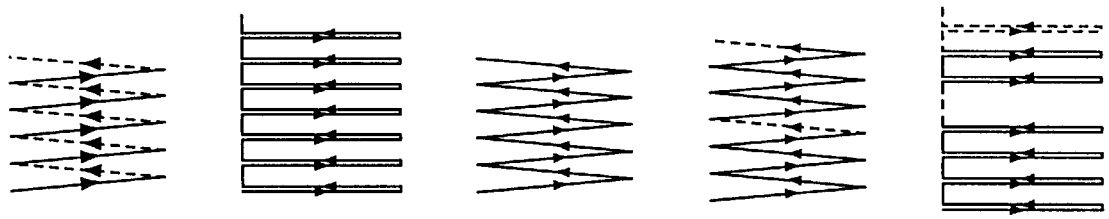
FIG. 5 shows variant ways of guiding the stylus.

The stylus can also be controlled so as to control and modulate the tilt angle of the liquid crystal molecules. As is known, liquid crystal molecules are not necessarily parallel to the surface, but are tilted from the plane through an angle depending on the polymer in the orientation layer. The direction of rubbing or scratching decides whether they tilt through a positive or negative angle to the x direction. How this can be used according to the invention is shown in FIG. 5; the scratching movement can occur always in the same direction, when a) the stylus is raised when returning or b) during the return each previously written track is overwritten. In the latter case the feed in the y direction must be synchronized accordingly. These two scratching methods result in the maximum polymer-specific tilt angle. The scratching pattern shown in c) results in a zero tilt angle, whereas pattern d) or e) results in values lower than the possible maximum. The tilt angle can therefore be controlled and modulated through choice of the method of scratching.

Figure 2:
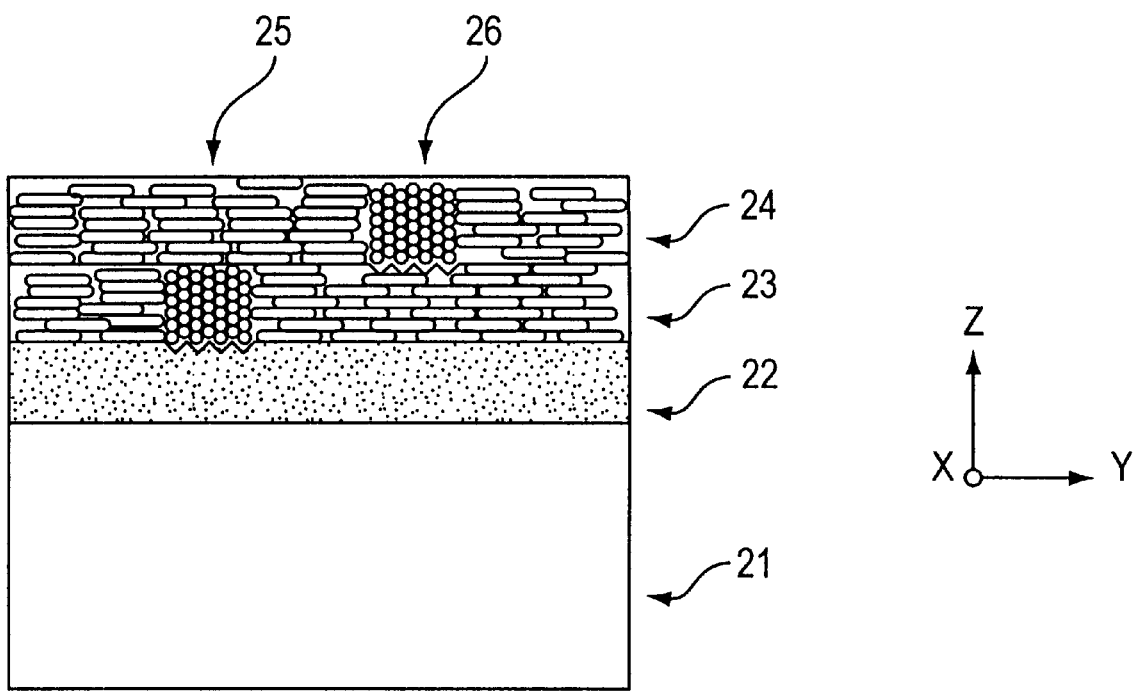
FIG. 2 is a diagrammatic sectional representation of another embodiment.

Since the cross-linked polymer is mechanically stable, the above method can be repeatedly used faith or without buffer polymer layers. This is shown in FIG. 2. Layers 21, 22, 23 correspond to layers 1, 2, 3 in FIG. 1. After the layer 23 has been cross-linked it is again rubbed and micromechanically scratched. Alternatively, further layers can be applied before rubbing and scratching, for example, to improve the optical properties or the orientation properties. Spin-coating of the layer 24 and subsequent cross-linking results in a further orientation pattern 25, 26. The method can be repeated as often as required, so that structured, three-dimensional refractive index patterns are obtained in the z direction also.

The invention is of use wherever static, that is, non-switching, refractive-index patterns with high resolution are needed. The range of application also includes all areas where components produced by the PPN process can be used. However, the invention can also be used to obtain finer structures, continuous changes in the direction of the director and additional control of the tilt angle, thus opening completely new possibilities in addition to the already-known PPN applications.

Figure 3:
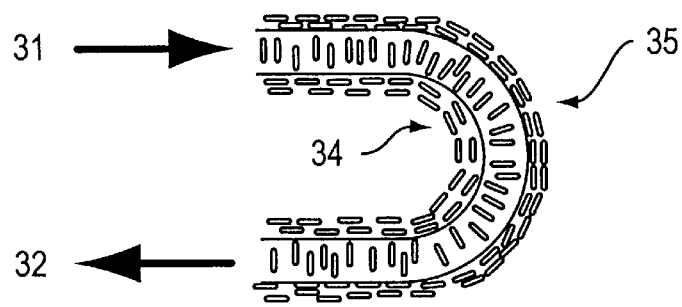
FIG. 3 is a diagrammatic top view of another embodiment.

Such possibilities include optical waveguide structures in integrated optics, such as couplers, coupling-in structures (such as gratings), delay lines or polarization-influencing structures. In combination with active or NLO-active ("non-linear optical") components, these optical waveguide structures can also be used in simple manner as a connecting network. Three-dimensional networks can in particular be used for coupling between layers or interaction-free crossings of optical waveguides. One example of the possibilities of the invention is the 180° optical waveguide bend in FIG. 3. Light 31 is conveyed in a waveguide 33 and makes a 180° bend as far as point 32. To produce a waveguide structure of this kind, the direction of scratching must be continuously variable locally both in the region 34 inside the bend and in the region 35 outside the bend, that is, in the waveguide 33 itself. This is not possible with any of the previously-known processes.

Static refractive-index patterns can also be used to produce high-resolution masks, such as for PPN illumination. The invention can be used to produce masks with higher resolution and complexity than in the photolithographic methods described in Swiss Patent Application No. 2036/95.

Static refractive-index patterns are also of great importance in preventing forgery of identity cards and documents of all kinds. Owing to the high resolution of the scratched patterns according to the invention, diffraction effects can be used as an additional security element, that is, the refractive-index pattern operates as a polarization-dependent hologram. If three-dimensional structures (volume holograms)

are generated as described hereinbefore, a great improvement can also be made in the scatter efficiency.

The invention is also very important in combination with the PPN process. The large-area regions can be optically structured by the PPN process, after which the microstructures can be applied by the method according to the invention. In that case, for example, the orientation layer 2 shown in FIG. 1 or the layer 22 shown in FIG. 2 will not consist of rubbed polymer layers or the possible intermediate layer between 23 and 24 will not consist of scratched polymer layers, but of photostructured polymer networks in which the additional patterns are scratched after cross-linking. The same applies to all the examples listed hereinbefore.

The optical components comprising a substrate, one or more orientation layers, and one or more anisotropic liquid crystal layers of cross-linked liquid crystalline monomers or oligomers having locally different orientation of the liquid crystal molecules, wherein each of the one or more orientation layers has a surface that is adjacent to a liquid crystal layer, the surfaces of the orientation layer adjacent the liquid crystal layer having an orientation pattern with a defined parallel or fan-like line structure in locally limited regions, the average spacing between the lines being not greater than the thickness of a liquid crystal layer and the angle between neighboring lines being not greater then 3°, may be prepared by a process comprising (a) providing a substrate, (b) coupling an orientation layer to the substrate, (c) micromechanically producing a parallel or fan-like line structure on the surface of the orientation layer, (d) applying a liquid crystal layer of liquid crystalline oligomers or monomers to the orientation layer, and (e) cross-linking the liquid crystal layer.

The optical components comprising a cell consisting of two spaced-apart substrates, one or more orientation layers on each substrate, and one or more anisotropic liquid crystal layers of cross-linked liquid crystalline monomers or oligomers disposed between the orientation layers and having locally different orientation of the liquid crystal molecules, wherein each of the one or more orientation layers has a surface that is adjacent to a liquid crystal layer, the surface of the orientation layer adjacent the liquid crystal layer having an orientation pattern with a defined parallel or fan-like line structure in locally limited regions, the average spacing between the lines being not greater than the thickness of a liquid crystal layer and the angle between neighboring lines being not greater than 3°, may be prepared by a process comprising (a) providing a first substrate, (b) coupling a first orientation layer to the first substrate, (c) micromechanically producing a parallel of fan-like line structure on the surface of the first orientation layer, (d) applying a liquid crystal layer of liquid crystal oligomers or monomers to the first orientation layer, (e) providing a second substrate, (f) coupling a second orientation layer to the second substrate, (g) micromechanically producing a parallel or fan-like line structure on the surface of the second orientation layer, and (h) cross-linking the liquid crystal layer to produce the optical component.

In each of these processes, the line structure is formed so that the direction of the optical axis varies depending on the orientation of the lines. In addition, one of the two substrates may be removed after cross-linking in a cell.

The following Example is representative of an embodiment of the invention.

EXAMPLE

Production of a component according to the invention

The following diacrylate components were used as cross-linkable monomers:

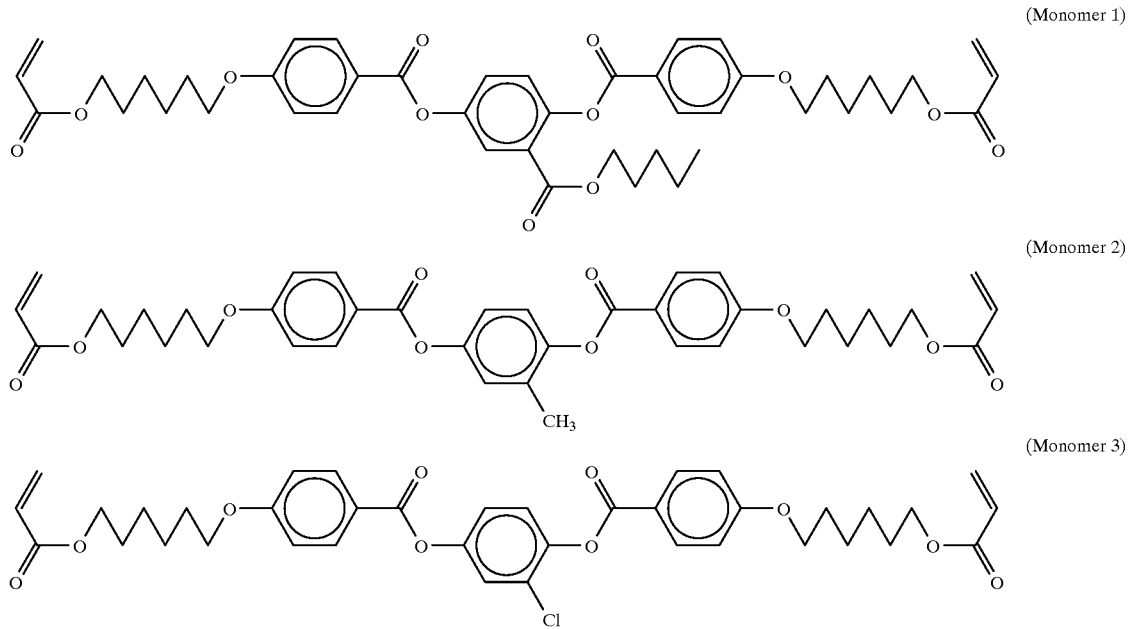

These components were used to develop a super-coolable nematic mixture MLCP with a particularly low melting-point (about 35° C.), permitting preparation at room temperature. The proportion of monomers 1, 2, 3 in the mixture was 80:15:5. 2% of the Ciba-Geigy photo-initiator IRGACURE 369 was also added to the mixture.

Figure 4:
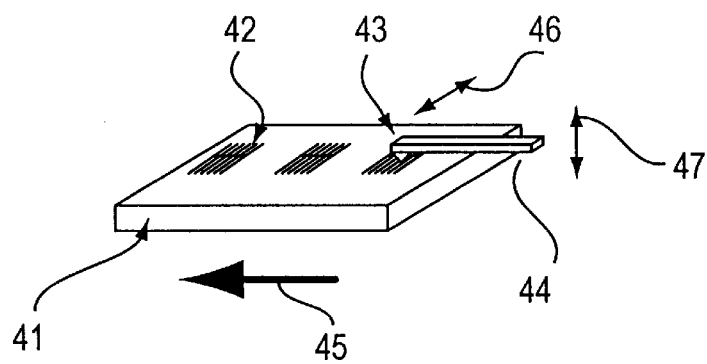
FIG. 4 shows an arrangement for producing components according to the invention.

A polyimide layer about 100 nm thick was applied in known manner by spin-coating to test plates of ITO (indium-tin oxide)-coated glass. The layer was rubbed in a conventional rubbing apparatus. Next, grating structures having a variable grating constant and at an angle of 45° to the original direction of rubbing were scratched with a piezoelectrically driven stylus. This is shown diagrammatically in FIG. 4; the coated sample 41 is secured to a table mechanically moved in the direction 45 (v=3.6 mm/s). The stylus 43 was secured to a small bar 44 and could be moved piezoelectrically in both directions 46 and 47. A constant frequency of 240 Hz was applied in the direction 46, corresponding to an average spacing of 7.5 nm between scratched lines, the line length being 10 μm. The grating period was produced by periodic interruption of the modulation. Alternatively the stylus could be periodically raised and lowered in direction 47.

The LCP layer was then applied by spin-coating (parameters: 2 minutes at 2000 rpm). The layer thickness could be varied within wide limits via choice of the concentration of MLCP in the anisole solvent. A concentration of 5% yielded a layer thickness of e.g. about 65 nm. Next, the layer was photo-cross-linked in vacuo (Hg arc lamp, 30 minutes). The cross-linked structures were investigated in a polarisation microscope and in the atomic force microscope (AFM). In the polarization microscope the gratings were clearly visible down to the limit of resolution of the microscope (that is down to grating periods of 720 nm), specifically the strips 42 in FIG. 4 had a differently oriented double refraction from the rest of the sample. Observation under the AFM showed gratings with a period of 240 nm. These measurements show that extremely fine refractive-index patterns can be generated in anisotropic cross-linked polymers.

The invention has been described in terms of its preferred embodiments. Upon reading the present specification, various alternative embodiments will become obvious to the skilled artisan. These embodiments are to be considered within the scope and spirit of the invention which is only to be limited by the claims which follow and their equivalents.

What is claimed is:

1. An optical component comprising a substrate, one or more orientation layers having an orientation layer pattern produced in different directions, and one or more anisotropic liquid crystal layers of cross-linked liquid crystalline monomers or oligomers having locally different orientation of the liquid crystal molecules, wherein each of the one or more orientation layers has a surface that is adjacent to a liquid crystal layer, the surface of the orientation layer adjacent the liquid crystal layer having an orientation pattern containing regions with a defined parallel or fan-like line structure, the average spacing between the lines being not greater than the thickness of a liquid crystal layer and the angle between neighboring lines being not greater than 3°.

2. The optical component according to claim 1, wherein the one or more orientation layers consist of photostructured polymer networks.

3. The optical component according to claim 1, wherein the line structure consists of micromechanically produced grooves.

4. The optical component according to claim 1, wherein at least one layer of the one or more liquid crystal layers comprises a mixture of monomers or oligomers which before cross-linking were liquid crystalline during at least the period of processing and over a temperature interval of at least 1° C. in the range from 0° C. to 60° C.

5. An optical component comprising a cell consisting of two spaced-part substrates, one or more orientation layers having an orientation layer pattern produced in different directions on each substrate and one or more anisotropic liquid crystal layers of cross-linked liquid crystalline monomers or oligomers disposed between the orientation layers and having locally different orientation of the liquid crystal molecules, wherein each of the one or more orientation layers has a surface that is adjacent to a liquid crystal layer, the surface of the orientation layer adjacent the liquid crystal layer having an orientation pattern containing regions with a defined parallel or fan-like line structure, the average spacing between the lines being not greater than the thickness of a liquid crystal layer and the angle between neighboring lines being in the range from 0° to 3°.

6. The optical component according to claim 5, wherein the one or more orientation layers consist of photostructured polymer networks.

7. The optical component according to claim 5, wherein the line structure consists of micromechanically produced grooves.

8. The optical component according to claim 5, wherein at least one layer of the one or more liquid crystal layers comprises a mixture of monomers or oligomers which before cross-linking were liquid crystalline during at least the period of processing and over a temperature interval of at least 1° C. in the range from 0° C. to 60° C.

9. A method of producing an optical component comprising a substrate, one or more orientation layers having an orientation layer pattern produced in different directions, and one or more anisotropic liquid crystal layers of cross-linked liquid crystalline monomers or oligomers having locally different orientation of the liquid crystal molecules, wherein each of the one or more orientation layers has a surface that is adjacent to a liquid crystal layer, the surface of the orientation layer adjacent the liquid crystal layer having an orientation pattern with a defined parallel or fan-like line structure in locally limited regions, the average spacing between the lines being not greater than the thickness of a liquid crystal layer and the angle between neighboring lines being in the range from 0° to 3°, which process comprises (a) providing a substrate, (b) coupling an orientation layer to the substrate, (c) micromechanically producing a parallel or fan-like line structure on the surface of the orientation layer, (d) applying a liquid crystal layer of liquid crystalline oligomers or monomers to the orientation layer, and (e) cross-linking the liquid crystal layer.

10. The method according to claim 9, wherein the line structure is formed so that the direction of the optical axis varies depending on the orientation of the lines.

11. The method according to claim 10, wherein one of the two substrates is removed after cross-linking in a cell.

12. A method of producing an optical component comprising a cell consisting of two spaced-apart substrates, one or more orientation layers having an orientation layer pattern produced in different directions on each substrate, and one or more anisotropic liquid crystal layers of cross-linked liquid crystalline monomers or oligomers disposed between the orientation layers and having locally different orientation of the liquid crystal molecules, wherein each of the one or more orientation layers has a surface that is adjacent to a liquid crystal layer, the surface of the orientation layer adjacent the liquid crystal layer having an orientation pattern with a defined parallel or fan-like line structure in locally limited regions, the average spacing between the lines being not greater than the thickness of a liquid crystal layer and the angle between neighboring lines being in the range from 0° to 3°, which comprises (a) providing a first substrate, (b) coupling a first orientation layer to the first substrate, (c) micromechanically producing a parallel or fan-like line structure on the surface of the first orientation layer, (d)

applying a liquid crystal layer of liquid crystal oligomers or monomers to the first orientation layer, (e) providing a second substrate, (f) coupling a second orientation layer to the second substrate, (g) micromechanically producing a parallel or fan-like line structure on the surface of the second orientation layer, and (h) cross-linking the liquid crystal layer to produce the optical component.

13. The method according to claim 12, wherein the line structure is formed so that the direction of the optical axis varies depending on the orientation of the lines.

14. The method according to claim 13, wherein one of the two substrates is removed after cross-linking in a cell.

* * * * *